(12) United States Patent
Huang

(10) Patent No.: US 6,781,640 B1
(45) Date of Patent: Aug. 24, 2004

(54) PROJECTION DISPLAY HAVING POLARIZATION COMPENSATOR

(75) Inventor: Austin L. Huang, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/440,102

(22) Filed: Nov. 15, 1999

(51) Int. Cl.$^7$ .......................................... G02F 1/1335
(52) U.S. Cl. ................... 349/5; 349/117; 349/8
(58) Field of Search ..................... 349/5, 8, 96, 117; 359/494, 499, 500; 353/122, 69

(56) References Cited

U.S. PATENT DOCUMENTS

| | | | |
|---|---|---|---|
| 4,094,581 A | 6/1978 | Baldwin et al. | |
| 5,126,868 A | 6/1992 | Kizaki et al. | |
| 5,221,982 A | 6/1993 | Faris | |
| 5,272,553 A | * 12/1993 | Yamamoto et al. | 349/8 |
| 5,329,387 A | 7/1994 | Yanagisawa et al. | |
| 5,381,278 A | 1/1995 | Shingaki et al. | |
| 5,459,593 A | 10/1995 | Ootaki | |
| 5,462,621 A | 10/1995 | Ishii | |
| 5,557,353 A | * 9/1996 | Stahl | 353/69 |
| 5,576,854 A | 11/1996 | Schmidt et al. | |
| 5,619,356 A | 4/1997 | Kozo et al. | |
| 5,784,139 A | * 7/1998 | Chigrinov et al. | 349/117 |
| 5,854,665 A | * 12/1998 | Iba | 349/119 |
| 6,151,086 A | * 11/2000 | Fergason | 349/5 |

FOREIGN PATENT DOCUMENTS

| | | |
|---|---|---|
| EP | 0 720 040 A2 | 12/1995 |
| EP | 0 821 258 A2 | 7/1997 |
| JP | 03-046692 | 2/1991 |
| JP | 03-202846 | 9/1991 |
| JP | 07-218909 | 8/1995 |
| JP | 10-186548 | 7/1998 |
| JP | 11-271893 | 10/1999 |
| JP | 11-305189 | 11/1999 |
| JP | 11-326861 | 11/1999 |
| JP | 2000-019326 | 1/2000 |
| JP | 2000-019455 | 1/2000 |
| JP | 2000-147656 | 5/2000 |
| JP | 2000-180792 | 6/2000 |
| JP | 2000-267046 | 9/2000 |

OTHER PUBLICATIONS

EPO Patent Abstracts of Japan, Publication No. 08304739; publication date Nov. 22, 1996; Application No. 08034127; Application Date Feb. 21, 1996. Seiko Epson Corp. Applicant; Komeno Kunio, Inventor. Title: Polarized Light Illuminator and Projection Type Display Device.

\* cited by examiner

*Primary Examiner*—Toan Ton
*Assistant Examiner*—Tai Duong
(74) *Attorney, Agent, or Firm*—Chernoff, Vilhauer, McClung & Stenzel, LLP

(57) ABSTRACT

A projection display system includes a light source, at least-one polarizer, at least one liquid crystal panel for generating an image, and a projection lens for projecting the image. The system includes a polarization compensator having a plurality of regions each having a respective birefringence. The birefringence of one of the regions is different than the birefringence of another of the regions. The birefringence of the various regions may be controlled electrically.

33 Claims, 4 Drawing Sheets

PROJECTION DISPLAY HAVING POLARIZATION COMPENSATOR

BACKGROUND OF THE INVENTION

The present invention relates to a polarization compensator used to compensate for the depolarization effects due to geometric, thermal, and material birefringence in an optical system. An optical system that utilizes polarization as the means for contrast control will benefit from this method of compensation.

It is well known that the polarization of light within an optical system is greatly influenced by the incident angle the light makes with respect to the different surfaces in the optical system. This results from the different Fresnel reflection coefficients for each polarization state. Polarization defects may be manifested as the "Maltese Cross" or thermal birefringence.

For example, in one optical system such as a liquid crystal light valve projector, an illumination source shines light onto a polarizer that reflects s polarized light to a liquid crystal display (LCD) panel, a also referred to as a liquid crystal light valve (LCLV). If the LCD is fully activated, then the LCD converts the s polarized light to p polarized light after it is reflected by a dielectric mirror behind the LCD. The p polarized light is reflected back to the polarizer, where it passes through the polarizer to the projection screen. If the LCD segment is not activated, then it does not change the polarization of the light and the light remains s polarized. The s polarized light is reflected back to the polarizing surface which in turn reflects the light back towards the illumination source. In a perfect system, 100% of the light reflected from the polarizer to the LCD is s polarized light. However, the polarizer does not reflect 100% s polarized light because of geometrically induced errors in the polarizer. Due to the cone of light that is incident on the LCD, all of the light in the cone is not polarized in the s direction by the polarizer with respect to the LCD. There are small rotations in polarization direction due to the angle of incidence of the light directed onto the polarizing surface. In this situation a higher degree of twist in the polarization axis occurs for a ray with a higher angle of incidence. The direction of rotation of the polarization away from the ideal is dependent upon the angle of incidence of the ray. For example, a ray incident at 5° might rotate the polarization axis by 2° while a ray incident at −5° would rotate the polarization axis by −2°.

The light rays with polarizations that have been slightly rotated away from the ideal are reflected by the dielectric mirror in the LCD and return to the polarizer with their polarization axis still slightly if rotated. This causes a slight percentage of these rays to plunge into the polarizer instead of being reflected by the polarizer. This small percentage of light is then projected onto the projection screen. Thus, when the LCD is completely off or inactivated, a small percentage of the light reflected off the LCD will not be completely polarized in the s direction with respect to the polarizing surface. This causes unwanted light to pass through the polarizer and slightly illuminate the screen, causing the "dark" state to be slightly illuminated which reduces the contrast ratio of the projection system.

Another problem associated with a dark or off state of the LCD projector is the problem of birefringence introduced by thermal gradients across the counter electrode substrate. The LCD itself, including the substrate, is packaged in an anodized aluminum case to reduce reflections that cause unwanted light scattering. Thus, light striking the case holding the LCD is absorbed, creating heat in the LCD package. This heat is transferred to the counter electrode substrate which causes the temperature to rise in the substrate, creating a thermal gradient across the substrate. This thermal gradient creates birefringence, causing the dark state or off state of the LCD to be "lighter" than desired. Therefore, when the LCD is completely turned off, what should be a totally black screen will actually have some light projected on the screen, causing the screen to appear gray instead of a deep black. Therefore, it would be desirable to eliminate the birefringence caused by the thermal gradients across the counter electrode substrate and thereby improve the contrast ratio by making the dark or off state of the LCD appear black instead of gray on the projection screen.

The primary conventional approach to polarization compensation is to use a birefringent film, typically quarter wave retardation films for reflective LCD panels and half wave retardation films for transmissive LCD panels. Examples of such systems include U.S. Pat. No. 5,459,593 and U.S. Pat. No. 5,576,854. However, this is only a partial solution to the problem, because this approach does not fully compensate for all of the different off-axis rays, and slightly different polarization states and orientation that is caused by the optical components in the system. In addition, because this system is passive, i.e. the retardance value of the film is fixed, the retardance cannot be changed to correct for current operating conditions, or to optimize performance of the system.

What is therefore desired is a projection display having a polarization compensator that is capable of providing improved polarization correction, that improves the contrast of the projection display system without sacrificing brightness, that corrects local polarization defects, and that allows an active correction of polarization defects to optimize correction of polarization defects based on current operating conditions.

BRIEF SUMMARY OF THE INVENTION

The present invention overcomes the drawbacks of the prior art by providing a projection display system having a polarization compensator. The projection display system includes a light source, at least one polarizer, at least one liquid crystal panel, and a projection lens for projecting an image. The polarization compensator has a plurality of regions each having a respective birefringence. The birefringence of one of the regions is different than the birefringence of another of the regions.

The present invention also provides a method for displaying an image. The method comprises the steps of providing polarized light, generating an image from the polarized light, correcting a plurality of polarization defects of the light by correcting at one location one polarization defect and correcting at another location another polarization defect, and projecting the image.

The various aspects of the present invention have one or more of the following advantages. The polarization compensator is capable of correcting polarization defects on a local basis, in contrast to the prior art systems which allow only a single, uniform correction provided by a single, passive retardation film. By correcting polarization defects locally, the system achieves greater contrast without sacrificing brightness. The present invention also provides embodiments which allow the polarization defects to be corrected locally through the use of electronically controllable birefringence. This provides for greater control over the correction of polarization defects. It also allows the birefringence to be changed locally over time, so that the polarization defects can be changed as needed at different times. This also enables the use of a feedback mechanism to automatically adjust the polarization compensator to yield the best system contrast under all operational condition.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
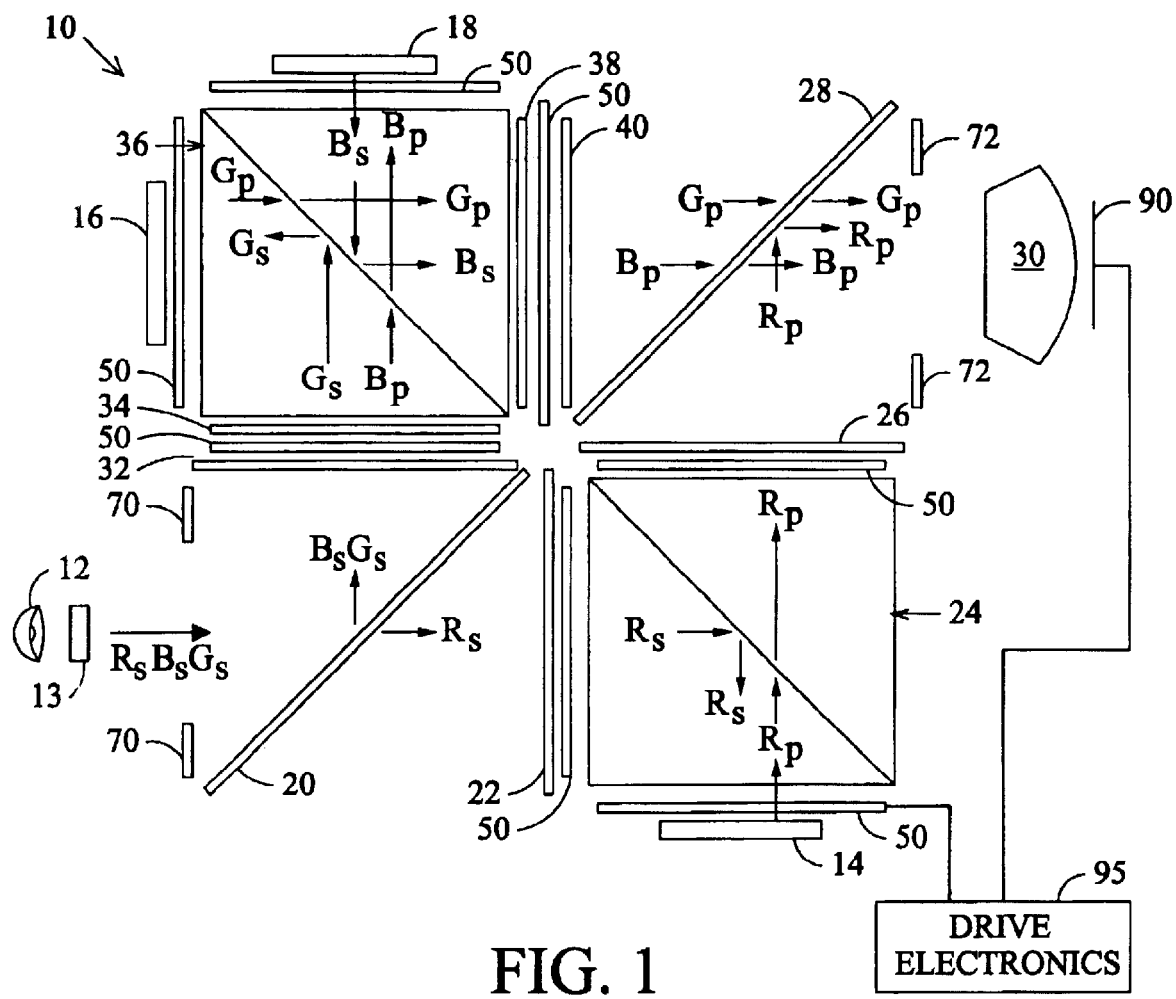
FIG. 1 is a schematic diagram of an exemplary embodiment of a projection display of the present invention.

Referring now to the figures, wherein like numerals refer to like elements, FIG. 1 shows an exemplary projection display 10 having a light source 12 and three reflective liquid crystal display (LCD) panels 14, 16, and 18, also referred to as liquid crystal light valves. The light from light source 12 passes through a polarizing device 13, such as a polarization converter, so that the light entering the entrance pupil 70 is polarized. Dichroic filter 20 splits the light into two color components. For the sake of illustration only, dichroic filter 20 transmits red light while reflecting blue and green light. Referring to the path of the red light component, the red light then passes through polarizer 22 and enters polarizing beam splitter 24. One polarization component (e.g., the s polarized component) is reflected by the beam splitter 24 toward the LCD panel 14, which generates a red image. The reflected image (now in the p polarization state) passes through the beam splitter 24 and through analyzer 26. The red light is then reflected by dichroic filter 28, and then transmitted through projection lens 30.

Turning to the blue and green color components, these are reflected by dichroic filter 20 and pass through polarizer 32 that transmits only s polarized light. The light then passes through a selective color component rotator 34, that rotates one of the light components (e.g., blue) from one polarization state (e.g., the s polarization state) to another polarization state (e.g., the s polarization state). (Color component rotator 34 is a wavelength specific half-wave plate, and may be obtained from Color Link in Boulder Colo. or Cambridge Research and Instrumentation in Cambridge, Mass.) Thus, the two color components (green and blue) entering the polarizing beam splitter 36 have different polarization states (e.g. s and p, respectively). The polarizing beam splitter reflects one of the color components (green) and transmits the other (blue). The light reflecting off of and passing through the polarizing beam splitter 36 is imaged using LCD panels 16 and 18. The green component image reflected by LCD panel 16 is transmitted through polarizing beam splitter 36 while the blue component image reflected by LCD panel 18 is reflected by the polarizing beam splitter 36. Both the blue and green components pass through another selective color component rotator 38, so that the two color components again have the same polarization state. The blue and green color components then pass through an analyzer 40. The blue and green color components then pass through dichroic filter 28, where they are combined with the red color component and projected through projection lens 30.

While an exemplary projection display 10 has been described, other projection display configurations that utilize LCD panels (reflective or transmissive) and polarizing devices may find utility with the present invention. Moreover, other color components, wavelength ranges, and polarization states may be used as desired.

Figure 2:
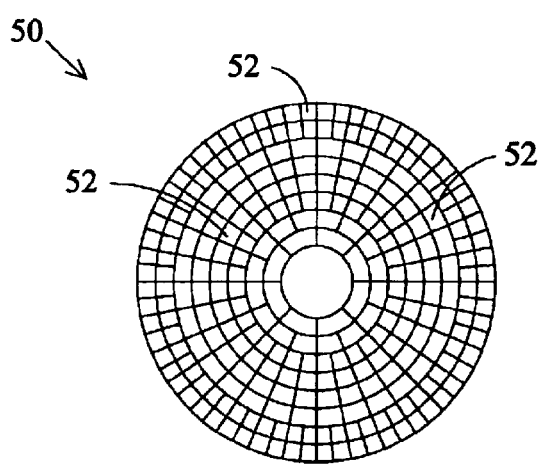
FIG. 2 is a front view of an exemplary embodiment of a polarization compensator.

The key to the present invention is the inclusion in the projection display system 10 of one or more polarization compensators 50. FIG. 2 shows a preferred embodiment of polarization compensator 50 having regions, preferably pixels 52, arranged in concentric fashion. Each pixel 52 has a respective birefringence. As polarized light passes through the various regions or pixels 52, the polarization of the light may be changed or adjusted depending on the birefringence of the particular pixel (or group of pixels). As described above, polarization defects may accumulate in the polarized light as the light passes through the projection display system. The polarization compensator 50 corrects these polarization defects on a local basis (pixel-to-pixel), thus having the ability to compensate more fully the different polarized light components that are incident to the polarization compensator. Thus, the polarization compensator 50 corrects the polarization defects within the light on a localized basis. The polarization compensator also may be used to linearalize an elliptically polarized input; that is, correct defects that create elliptically polarized light so that the light is either fully s or p polarized.

Figure 4:
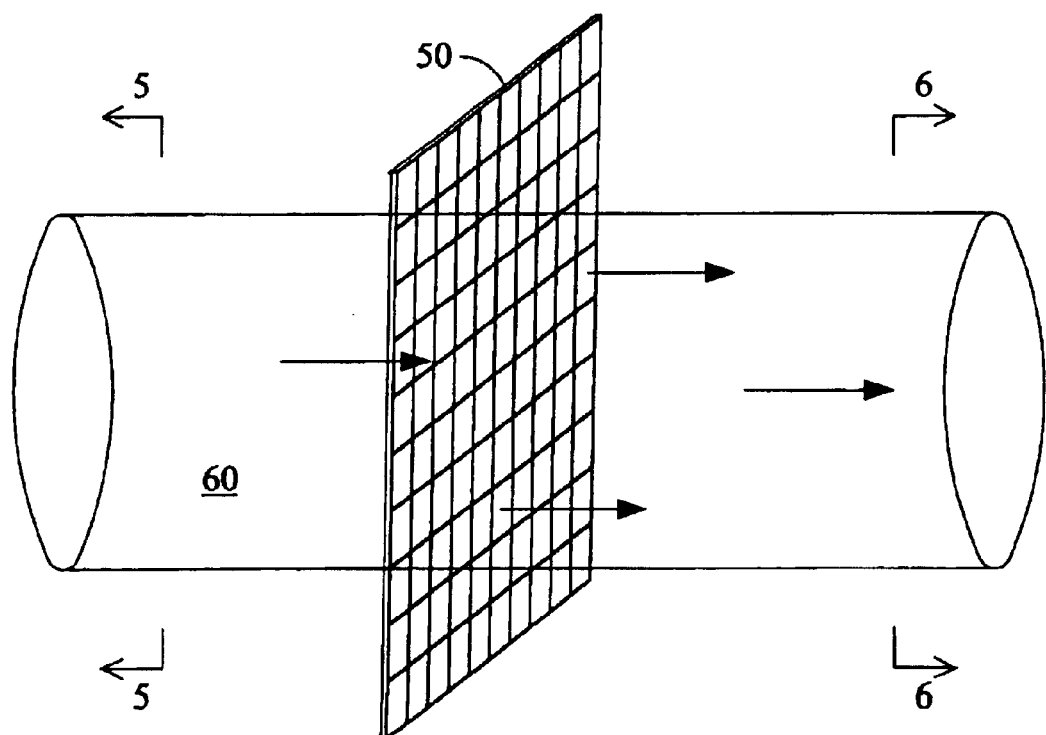
FIG. 4 is a side view of a light beam traveling left to right through an exemplary polarization compensator.
Figure 5:
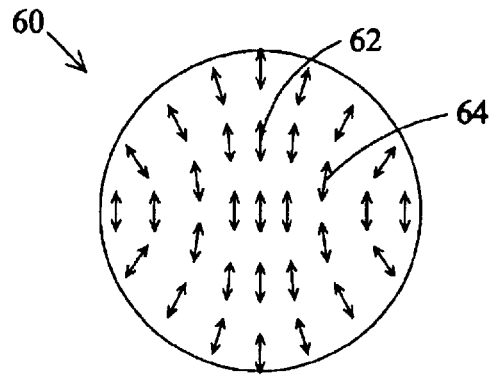
FIG. 5 is a cross section of the light beam of FIG. 4 taken along the line 5—5.
Figure 6:
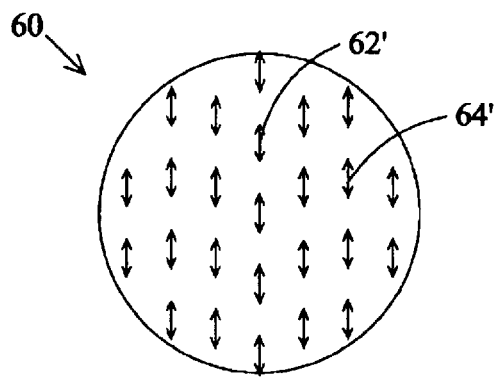
FIG. 6 is a cross section of the light beam of FIG. 4 taken along the line 6—6.

FIGS. 4–6 illustrate this localized correction of polarization defects. FIG. 4 illustrates a polarized light beam 60 traveling from left to right through a polarization compensator 50. FIG. 5 is a cross section of the polarized light beam prior to correction of the polarization defects. The arrows 62 represent the polarization direction, whether p (straight up and down) or s (side to side). As can be seen, the light 62 at the center of the light beam is substantially in the p polarization state, but the light has polarization defects, in that the light beam 60 contains significant amounts of s polarization as one travels from the center to the lateral edges of the light beam, such as at 64. In addition, it is also seen that the polarization defects are not uniform, and thus would not be completely corrected using a traditional halfwave plate.

FIG. 6 illustrates a cross section of the light beam 60 after passing through the polarization compensator 50. As can be seen, the polarization compensator did not change the polarization of the light 62' at the center of the beam, but corrected those other portions containing s components, such as at 64'. As a result, the polarized light beam is substantially p polarized, without an appreciable lose of brightness.

Referring again to FIG. 1, polarization compensator(s) 50 may be placed at any location in the projection display system 10 following polarization of the light. Suggested placement of the polarization compensator(s) 50 would be at the entrance pupil 70 or exit pupil 72 (illumination and projection aperture stop respectively). Another possible location to place the polarization compensator 50 would be directly in front of the LCD imager panels 14, 16 and 18. Alternatively, the polarization compensator 50 could be built into the LCD imager panels 14, 16 and 18 themselves. Another possible location is between the polarizer/analyzer pairs, such as after the polarizer 22 or before the analyzer 26. FIG. 1 illustrates a variety of possible locations for polarization compensator(s) 50. Of course, the present invention may be used with only a single polarization compensator 50, the number shown in FIG. 1 being for purposes of showing possible locations only.

Figure 7:
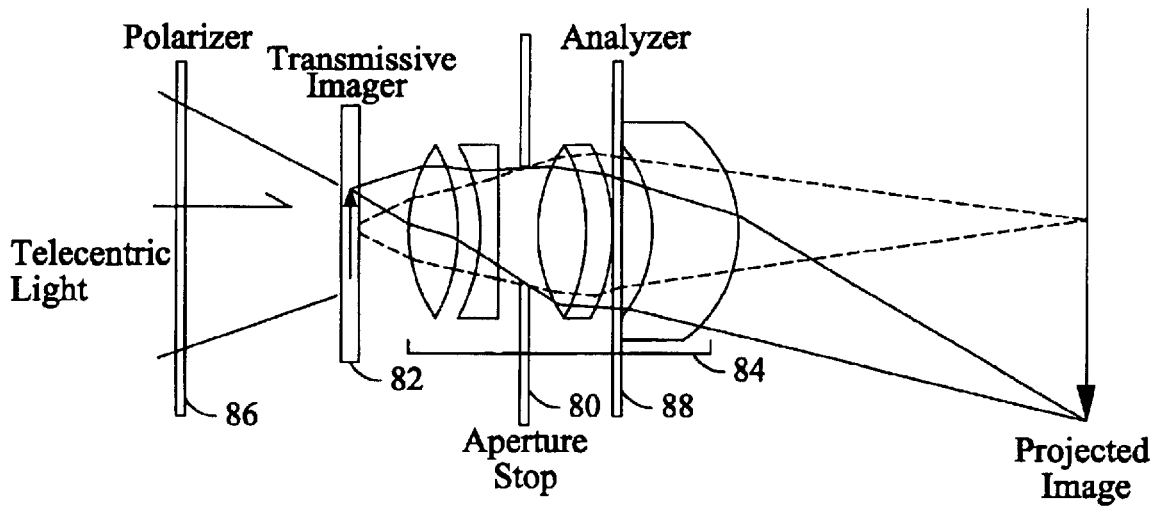
FIG. 7 is a side view of a ray diagram of an exemplary projection display system.

A preferred location for the polarization compensator is the aperture stop. Referring now to FIG. 7, there is one unique physical location in the optical system where the angular distribution of the light is directly related to its physical location. This place is known as the aperture stop, and is shown at 80 in FIG. 7. (For ease of illustration, FIG. 7 depicts a simplified projection display system utilizing a transmissive LCD imager panel 82, lenses 84, polarizer 86 and analyzer 88.) Assuming a circularly symmetric optical system (as most systems are) the radial distance from the "center" of the aperture stop represents an increase in the angle of light that strikes the image or object planes. This is where the polarization compensator should be placed for the maximum polarization correction effect. Of course, the number and placement of polarization compensator(s) 50 will be determined by the projection display system architecture.

Figure 3:
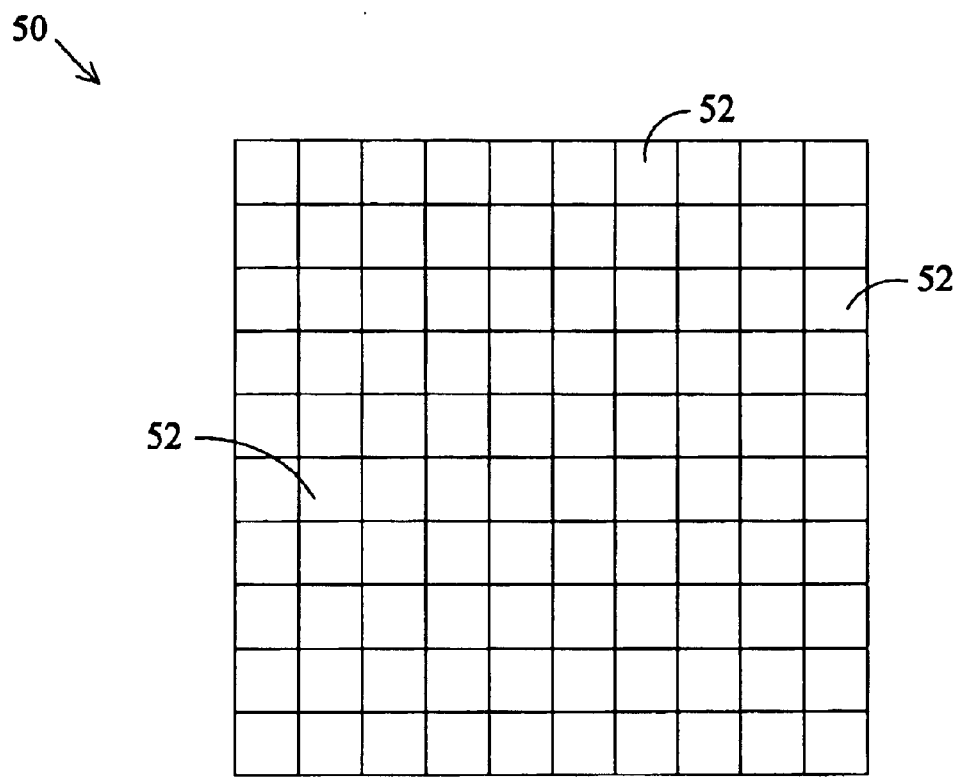
FIG. 3 is a front view of another exemplary embodiment of a polarization compensator.

Polarization compensators 50 may take any form in which the polarization compensator is capable of correcting polarization defects on a local or pixel-to-pixel basis. One preferred embodiment of a polarization compensator is one in which the polarization compensator 50 is a transmissive liquid crystal device having electrically controlled birefringence. The pixels of the transmissive LCD would ideally have a concentric circular pattern (like a bulls-eye target), as shown in FIG. 2. Alternatively, a standard rectangular matrix pattern (or any other organization) for the pixels could be used, as shown in FIG. 3. The polarization compensator may have a nominal retardance value of 278 nm (half wave for green light in single pass) and it could be compensated with film retardance in order to get a broadband optical response. The pixels can be individually controlled to have retardance values anywhere from 0 to 278 nm thereby enabling the polarization compensator to compensate for incident polarization states that are elliptical through 90 degrees out of phase. Thus, the system may correct an elliptically polarized input that should instead be linearly polarized.

Figure 8:
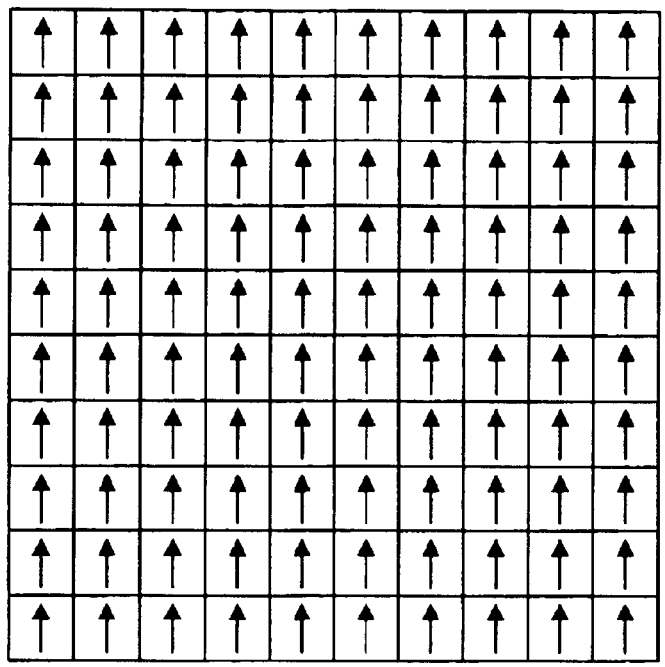
FIG. 8 is a schematic view of a conventional optical axis orientation of a liquid crystal device.
Figure 9:
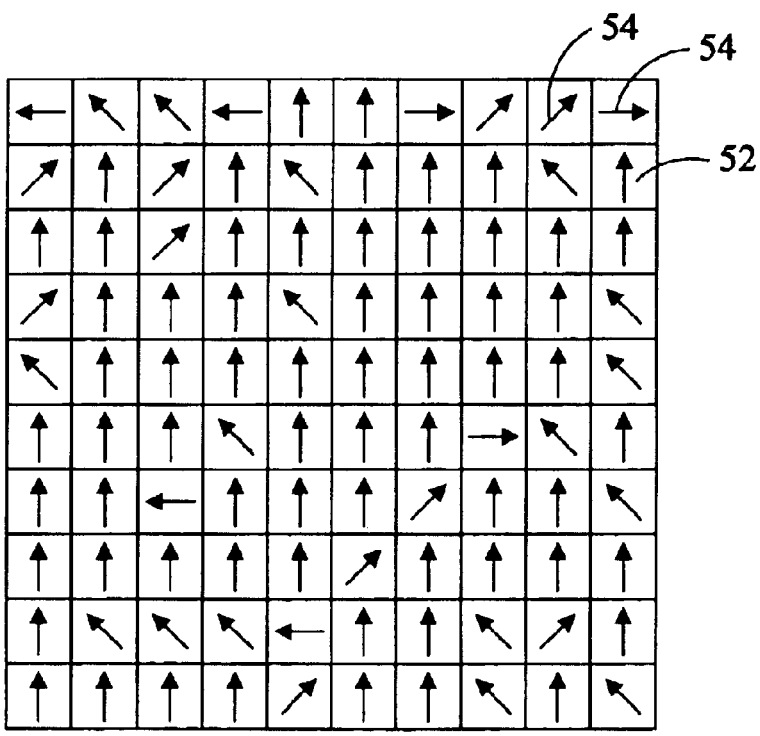
FIG. 9 is a schematic view of an optical axis orientation of an exemplary polarization compensator of the present invention.

In addition, a second parameter, the director orientation of the transmissive LCD panel of the polarization compensator, may be varied if a photolithography method is used in the cell construction of the polarization compensator. The director orientation controls the twist of the liquid crystals, and hence the degree of change in polarization of light passing through the LCD panel. Conventional mechanical rubbing processes used to make LCD panels produce uniform director orientations, as illustrated in the LCD panel 50' FIG. 8. However, the alignment layer of an LCD panel may be patterned using photolithography, which allows the director orientations of the individual pixels to be varied on a pixel-by-pixel basis. FIG. 9 represents one such possible polarization compensator 50 in which the pixels 52 have varying director orientations 54. The combination of electronically controllable retardance/birefringence and patternable director orientation for each pixel of a matrix allows for improved correction of the polarization orientation of the light in an optical system.

The ability to electrically control the birefringence on a local, pixel by pixel basis, allows for several advantages. First, the polarization defects may be corrected in real time "on the fly." That is, the polarization compensator 50 may be adjusted to allow for optimal contrast while the projection display 10 is operating, so that the polarization compensator 50 accounts for polarization defects arising from current operating conditions. Second, the polarization compensator 50 may be used in conjunction with a feedback mechanism to automatically adjust the polarization compensator 50 to achieve optimum polarization defect correction. Referring to FIG. 1, the projection display system 10 may include a detector 90, such as a CCD, that is connected to the drive electronics 95 of the polarization compensator(s) 50. The detector 90 provides a signal to the polarization compensator 50 representative of the image generated by the projection display system 10. Through the use of such a feedback mechanism, the projection display system 10 may through the drive electronics 95 automatically adjust the polarization compensator 50 to achieve the optimal performance of the system.

It will be recognized that any value of retardance and pattern could have been selected and the location of the polarization compensator(s) 50 will be determined by the projection display system design. It will also be recognized that the ability to adjust only the localized birefringence and not the director orientation will provide better polarization correction than a single sheet of retardation film. In addition, where the polarization compensator 50 is an LCD, a variety of factors may be manipulated to alter the polarization characteristics of the transmitted light, such as the liquid crystal material itself, the cell gap separation, the director orientation, the degree of pre-tilt, and the pixel size.

A second less costly embodiment of a polarization compensator 50 utilizes a passive birefringent plate in which the birefringence/retardance values and/or director orientation of the respective pixels varies as a function of location on the plate, but in which the pixels are not electrically controllable. Such a polarization compensator 50 would be constructed with prior knowledge of the values required to correct for the various polarization defects as well as the director orientation for each pixel location. Cholesteric liquid crystal techniques are well suited for these applications since they can be both locally patterned to have different birefringent values as well as have different director orientations for each pixel location on the plate.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the which follow.

What is claimed is:

1. A projection display system, comprising:
   (a) a light source;
   (b) at least one polarizer for polarizing light from said light source;
   (c) at least one liquid crystal panel for generating an image, and which together with said polarizer, acts to polarize light from said light source generally into a uniaxial orientation;

(d) a projection source for projecting said image;

(e) a polarization compensator having a plurality of light transmitting regions each having an incident face for receiving incident light and each having a respective birefringence, where said birefringence of each respective region is based on the variance of the polarization of said incident light on the incident face of said respective region from said uniaxial orientation, where said birefringence reduces said variance, and where said birefringence of at least one of said regions is different than said birefringence of another of said regions;

(f) wherein said polarization compensator is located substantially coincident with where the angular distribution of the light is directly related to its physical location within said projection display system.

2. The projection display of claim 1 wherein said regions are arranged in a rectangular matrix.

3. The projection display of claim 1 wherein said regions are arranged concentrically.

4. The projection display of claim 1 having more than two regions.

5. The projection display of claim 1 wherein said polarization compensator is a transmissive liquid crystal device.

6. The projection display of claim 5 wherein at least one of said regions has a director orientation that is different than another director orientation of another of said regions.

7. The projection display of claim 1, further comprising an analyzer, and said polarization compensator is located between said polarizer and said analyzer.

8. The projection display of claim 1 wherein said polarization compensator is located at an aperture stop of said projection display.

9. The projection display of claim 1 wherein said polarization compensator is built into said liquid crystal panel.

10. The projection display of claim 1 wherein said polarization compensator is located at one of an entrance pupil and an exit pupil.

11. The projection display of claim 1 wherein said polarization compensator is located adjacent to said liquid crystal panel.

12. The projection display of claim 1 wherein each of said regions has electrically controlled birefringence.

13. The projection display of claim 12, further comprising a feedback mechanism to adjust said birefringence of said regions.

14. The projection display of claim 12 wherein said birefringence of said regions is adjustable over time.

15. The projection display of claim 1 wherein said birefringence of each of said regions is fixed.

16. The projection display of claim 1, further comprising a plurality of liquid crystal panels.

17. A method for displaying an image, comprising:

(a) providing light generally polarized in a uniaxial orientation;

(b) generating an image from said polarized light;

(c) determining a variance, from said uniaxial orientation, of the polarization of light at a first location and a second location of said image, each of said locations being located in a plane that is substantially perpendicular to said light;

(d) reducing said variance at said first and second locations where said reduction at said first location is different than said reduction at said second location;

(e) projecting said image;

(f) wherein said variance is said reduced at a location substantially coincident with where the angular distribution of the light is directly related to its physical location.

18. The method of claim 17 wherein said locations correspond to pixels.

19. The method of claim 18 wherein said pixels are arranged in a rectangular matrix.

20. The method of claim 18 wherein said pixels are arranged concentrically.

21. The method of claim 17 wherein said polarization defects are corrected at more than two locations.

22. The method of claim 17 wherein said polarization defects are corrected using a transmissive liquid crystal device.

23. The method of claim 22 wherein said transmissive liquid crystal device has at least one pixel having a director orientation that is different than another director orientation of another pixel.

24. The method of claim 17, further comprising transmitting said light through an analyzer, and said polarization defects are corrected before said light is transmitted through said analyzer.

25. The method of claim 17 wherein said polarization defects are corrected at an aperture stop.

26. The method of claim 17 wherein said polarization defects are corrected at a liquid crystal panel.

27. The method of claim 17 wherein said polarization defects are corrected at one of an entrance pupil and an exit pupil.

28. The method of claim 17 wherein said polarization defects are corrected at a location adjacent to a liquid crystal panel.

29. The method of claim 17 wherein said polarization defects are corrected by providing a polarization compensator having a plurality of pixels each having a respective birefringence, said birefringence of one of said pixels being is different than said birefringence of another of said pixels.

30. The method of claim 29, further comprising electronically controlling said birefringence of said pixels.

31. The method of claim 17 further comprising the step of feeding back an output signal representative of said light in order to correct said polarization defects.

32. The method of claim 17 wherein said polarization defects are corrected at different times.

33. The method of claim 17 wherein the birefringence of each of said locations is fixed.

* * * * *

UNITED STATES PATENT AND TRADEMARK OFFICE
CERTIFICATE OF CORRECTION

| | |
|---|---|
| PATENT NO. | : 6,781,640 B1 |
| APPLICATION NO. | : 09/440102 |
| DATED | : August 24, 2004 |
| INVENTOR(S) | : Austin Huang |

Page 1 of 1

It is certified that error appears in the above-identified patent and that said Letters Patent is hereby corrected as shown below:

Col. 3, line 65
Change "(e.g., the s polarization state)" to read --(e.g., the s polarization state)--.

Col. 6, line 60
Change "neighborhood of a an exemplary" to read --neighborhood of an examplary--.

Col. 6, line 67
Change "limited only by the which follow" to read --limited only by the claims which follow--.

Col. 8, lines 47-48
Change "pixels being is different" to read --pixels being different--.

Signed and Sealed this

First Day of May, 2007

JON W. DUDAS
*Director of the United States Patent and Trademark Office*